March 2, 1954     T. A. ST. CLAIR     2,670,759
SAFETY RELIEF VALVE
Filed Dec. 22, 1950
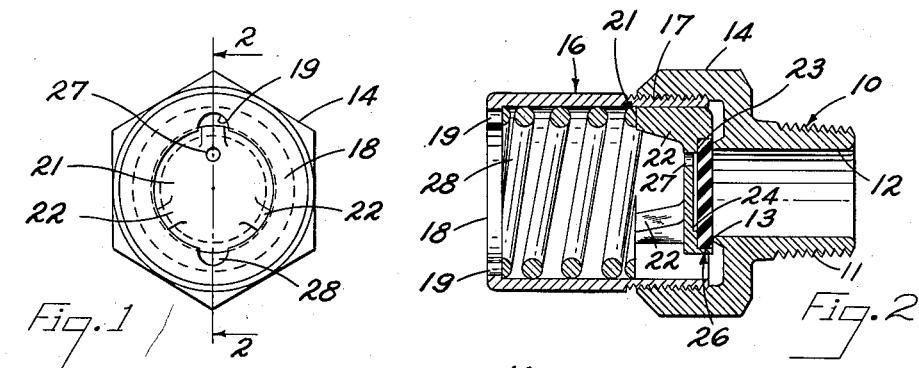
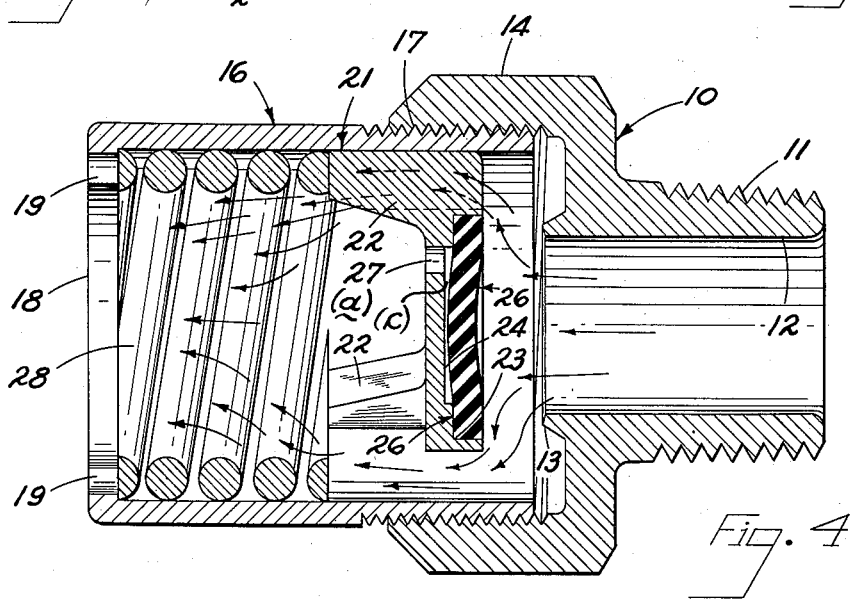
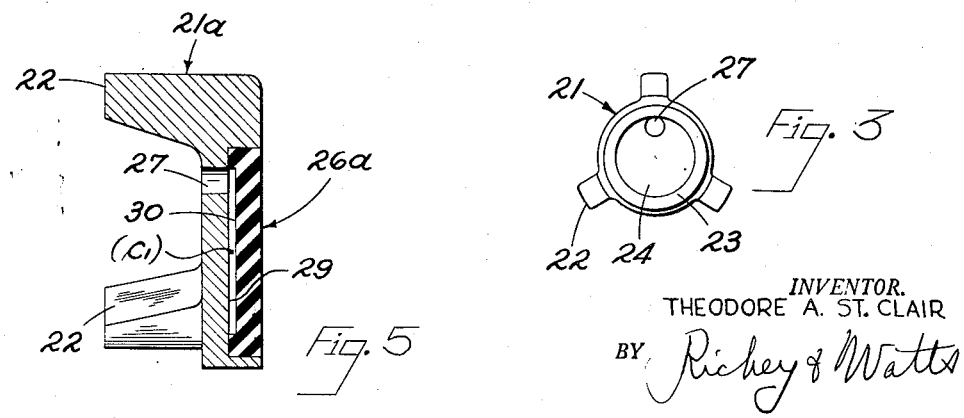
INVENTOR.
THEODORE A. ST. CLAIR
BY Richey & Watts
ATTORNEYS Patented Mar. 2, 1954

2,670,759

UNITED STATES PATENT OFFICE 2,670,759

SAFETY RELIEF VALVE

Theodore A. St. Clair, South Euclid, Ohio, assignor to The Weatherhead Company, Cleveland, Ohio, a corporation of Ohio Application December 22, 1950, Serial No. 202,206

4 Claims. (Cl. 137—540)

This invention relates to pressure relief or safety valves for relieving excess pressure in systems containing compressed gases. The type of valve to which this invention relates incorporates a valve body having a slidably mounted poppet therein, inlet and outlet passages with a valve seat therebetween, a disc of rubber-like material on the poppet for engaging the valve seat, and a spring to maintain the engagement up to a certain pressure at the inlet.

The principal objects and advantages of the invention are the improvement of the sealing action, simplification of the structure, reduction in the cost of manufacture thereof, reduction in weight with a corresponding increase in sensitivity of the valve and facilitating replacement and removal of the rubber-like valve disc without danger of the disc becoming dished in service.

These objects and advantages are, in a preferred form of the invention, attained by an exceedingly simple, economical and lightweight structure for mounting the rubber-like valve disc member. In a preferred embodiment of the invention, a two-depth cavity vented at the rear is formed in the poppet. The rubber-like valve disc is merely placed in the cavity whereupon, in its relaxed position, a chamber is formed behind the disc. When the valve is closed, the spring pressure urging the disc against the seat precludes displacement of the disc from its cavity, and when it opens the dynamic effects of the fluid flowing past the poppet create a positive pressure against the face of the disc, urging it into the cavity and by means of the vent produce a lower pressure in the chamber behind the disc so that the pressure differential effectively acts to retain the disc in the poppet. These advantages are attainable without requiring detent means such as spun lips, threaded nuts, or the like to retain the valve disc in the poppet. This, in turn, reduces the danger of distorting the valve disc and, hence, improves the seal as well as reduces the weight of the assembled poppet. This also simplifies and cheapens the construction and facilitates replacement of the valve disc. Yet, all these advantages are obtained by the invention without danger of the valve disc becoming displaced from its poppet in either the closed or the open position of the valve.

The aforesaid objects and advantages and others will be apparent to those skilled in the art from the following detailed description of a preferred embodiment of the invention.

In the drawings:

Fig. 1 is a view of the outlet end of the valve;

Fig. 2 is a section taken on 2—2 of Fig. 1;

Fig. 3 is an end view of the poppet;

Fig. 4 is an enlarged section diagrammatically illustrating the action of the valve when it is open; and, Fig. 5 is a section through the poppet assembly of a modified form of the invention.

The relief valve has a body part 10 preferably machined from hexagonal stock to provide a threaded nipple 11 for attachment to the pressure source. It has drilled therethrough an inlet passageway 12 terminating in a machined valve seat 13 formed in body part 10. The hexagonal sleeve 14 of the body is internally threaded to receive the other body part 16, which is preferably stamped from sheet metal stock and has threads formed thereon as at 17 for connection to the sleeve 14. Body part 16 has an inturned flange or lip 18 which may be notched as at 19 to accommodate a tool used for assembling the two body parts together. Slidable within the tube formed by the body part 16 is a valve poppet 21, which is guided and aligned within the tube by three equally-spaced ears 22 connected to the main body of the poppet.

The poppet has formed therein a cavity for reception of a soft sealing valve disc. In the preferred form of the invention this cavity has a stepped or two-depth cross section, there being an annular depression 23 machined in the poppet at the peripheral zone of the cavity and a relatively shallow inner or central depression 24. Mounted in the cavity is the sealing or resilient valve disc 26 which, in the preferred embodiment of the invention, is made of rubber or rubber-like material. A material which is found suitable in liquefied petroleum gas installations, for example, is one wherein the disc 26 is made up of a synthetic rubber which is sold in the trade under the name of "Hycar," and compounded to have a durometer reading of 60 to 70. A small vent or port 27 is formed in the poppet body which leads to the chamber (c) formed between the sealing disc and the poppet due to the offset cavity construction. The poppet is held against the valve seat by a coil spring 28 seated at one end on the ears 22 of the poppet and at the other end against the inturned flange 18.

I prefer that the dimensions of the poppet cavity and the valve disc 26 be such that the valve disc makes a nice fit with the periphery of the cavity, but yet can be readily fitted into the cavity and removed therefrom without distortion or destruction of the disc. For example, in a typical construction the valve disc may be approximately seven-eighths of an inch in diameter and one-eighth of an inch thick, whereas the cavity is held to a dimension wherein its maximum diameter is one equal to the diameter of the valve disc and the minimum diameter is ten-thousandths of an inch smaller than the valve disc. Also, in this size the chamber between the valve disc and the poppet would be in the order of fifteen to twenty-thousandths of an inch in depth. The purpose of the aforesaid tolerances is to insure that the valve disc will be aligned within the poppet and will make sealing engagement at least with the radial face of the outer portion 23 of the cavity, and possibly will also seal with the peripheral edge of the cavity.

The function of the aforesaid construction in eliminating the need for positive retaining means for the valve disc 26 will be best understood with reference to Fig. 4 wherein the flow of fluid past the parts when the relief valve has opened is indicated diagrammatically. As indicated generally by the small arrows, when the valve is opened fluid rushes against the inlet side or face of the disc 26, thereby tending to urge it into the chamber. Likewise, fluid flowing out and around the poppet and passing out of the outlet is of such character that, relative to the pressure in the slip stream, a low pressure zone indicated at (a) in Fig. 4. Thus relatively speaking, gas is exhausted from the chamber (c) formed between the valve disc and the poppet so that there is, in effect, a pressure differential created between the two faces of the valve disc which causes the valve disc to be forced partially into the chamber and which firmly holds the valve disc in the cavity when the valve is open even though no mechanical retaining means is employed. This explains why it is desirable that a seal be effected between the valve disc and the poppet around the edge of the inner depression 24. This self-holding action, due to gas flow and the dynamic effects thereof, is maintained until the poppet is again seated by spring force, whereupon the valve disc is maintained in position by the reaction of the valve seat 13.

Thus, with the construction just described, the parts are reduced in size and weight and are cheaper to manufacture than constructions requiring screws or the like to retain the valve disc, yet the valve disc may be readily removed, replaced, or possibly turned over, and even though no mechanical fastening means are employed it will not become dislodged. There are no mechanical means provided which may distort the valve disc and prevent it from making a good seal with the valve seat 13. Thus, new and improved results are obtained in a simpler structure than heretofore possible.

With respect to Fig. 5, which shows a modified form of the invention, it has the same results as that just described except that the pressure differential chamber is formed not by a two-step cavity, but rather by specially molding the rubber valve disc, as opposed to stamping it from a flat sheet as is possible in the preferred form of the invention.

For example, in Fig. 5 the poppet 21a is formed with a uniform depth cavity 29 instead of a stepped cavity as in the preferred form of the invention. However, in order to provide the pressure differential chamber (c₁) the valve disc 26a may be molded or otherwise formed to have a central recess or cavity 30 which, in cooperation with the facing wall of the poppet body, forms the necessary cavity that may be vented by port 27 to provide the self-holding action just described when the valve is open to relative pressure.

Having completed a detailed description of a preferred embodiment of the present invention so that others skilled in the art may be able to understand and practice the same, I state that what I desire to secure by Letters Patent is not limited by said preferred embodiment but rather is defined in what is claimed.

What is claimed is:

1. A relief valve comprising a body having a fluid passageway therethrough, means for connection to a gaseous pressure source, a valve seat in said passageway facing away from said connecting means to divide said passageway into an inlet adjacent to said connecting means and an outlet on the side of the valve seat removed from said connecting means, a poppet in said passageway, and a spring urging said poppet toward said seat, said poppet and body being formed to let fluid flow therebetween with the poppet unseated, said poppet being formed with a cavity facing said valve seat, an imperforate valve disc of rubber-like material disposed in said cavity and having a peripheral portion in detachable sealing engagement with an outer annular wall area of said cavity, means for spacing the rearward side of said disc from the bottom of said cavity to provide a gas chamber, and a vent port in said poppet connecting said chamber to said outlet whereby the gaseous pressure differential across said valve disc urges the latter against said poppet with the latter in its open position.

2. A relief valve comprising a body having a fluid passageway therethrough, means for connection to a gaseous pressure source, a valve seat in said passageway facing away from said connecting means to divide said passageway into an inlet adjacent to said connecting means and an outlet on the side of the valve seat removed from said connecting means, a poppet in said passageway, and a spring urging said poppet toward said seat, said poppet and body being formed to let fluid flow therebetween with the poppet unseated, said poppet being formed with a cavity facing said valve seat, an imperforate valve disc of rubber-like material disposed in said cavity and having a peripheral portion in detachable sealing engagement with an outer annular wall area of said cavity, means for spacing the rearward side of said disc from the bottom of said cavity to provide a gas chamber, and a vent port in said poppet connecting said chamber to said outlet whereby the gaseous pressure differential across said valve disc urges the latter against said poppet with the latter in its open position, said poppet being free of mechanical obstructions to axially outward displacement of said valve disc.

3. A relief valve comprising a body having a fluid passageway therethrough, means for connection to a gaseous pressure source, a valve seat in said passageway facing away from said connecting means to divide said passageway into an inlet adjacent to said connecting means and an outlet on the side of the valve seat removed from said connecting means, a poppet in said passageway, and a spring urging said poppet toward said seat, said poppet and body being formed to let fluid flow therebetween with the poppet unseated, said poppet being formed with a cavity facing said valve seat, said cavity having a peripheral zone of one depth and a central zone of a greater depth, an imperforate valve disc of rubber-like material disposed in said cavity and having a peripheral portion in detachable sealing engagement with the peripheral zone of said cavity, the central zone of said cavity being spaced from said valve disc to provide a gas chamber, and a vent port in said poppet connecting said chamber to said outlet whereby the gaseous pressure differential across said valve disc urges the latter against said poppet with the latter in its open position.

4. A relief valve comprising a body having a fluid passageway therethrough, means for connection to a gaseous pressure source, a valve seat in said passageway facing away from said connecting means to divide said passageway into an inlet adjacent to said connecting means and an outlet on the side of the valve seat removed from said connecting means, a poppet in said passageway, and a spring urging said poppet toward said seat, said poppet and body being formed to let fluid flow therebetween with the poppet unseated, said poppet being formed with a cavity facing said valve seat, an imperforate valve disc of rubber-like material disposed in said cavity and having a peripheral portion in detachable sealing engagement with an outer annular wall area of said cavity, means for spacing the rearward side of said disc from the bottom of said cavity to provide a gas chamber, and a vent port in said poppet connecting said chamber to said outlet whereby the gaseous pressure differential across said valve disc urges the latter against said poppet with the latter in its open position.

THEODORE A. ST. CLAIR.

References Cited in the file of this patent

UNITED STATES PATENTS

| Number | Name | Date |
|---|---|---|
| 297,066 | Coale | Apr. 15, 1884 |
| 1,885,121 | Loweke | Nov. 1, 1932 |
| 2,254,209 | Buttner | Sept. 2, 1941 |
| 2,356,410 | Krugler | Aug. 22, 1944 |

FOREIGN PATENTS

| Number | Country | Date |
|---|---|---|
| 8,808 | Great Britain | of 1887 |